(12) United States Patent
Visajtaev

(10) Patent No.: US 9,796,062 B2
(45) Date of Patent: Oct. 24, 2017

(54) MACHINING DEVICE

(71) Applicant: SIEMENS AKTIENGESELLSCHAFT, München (DE)

(72) Inventor: Marat Visajtaev, Bottrop (DE)

(73) Assignee: SIEMENS AKTIENGESELLSCHAFT (DE)

( * ) Notice: Subject to any disclaimer, the term of this patent is extended or adjusted under 35 U.S.C. 154(b) by 41 days.

(21) Appl. No.: 14/873,245

(22) Filed: Oct. 2, 2015

(65) Prior Publication Data

US 2016/0096249 A1    Apr. 7, 2016

(30) Foreign Application Priority Data

Oct. 6, 2014   (DE) .................. 10 2014 220 161

(51) Int. Cl.
*B24B 19/02* (2006.01)
*F01D 5/02* (2006.01)
*B23Q 9/00* (2006.01)
*B24B 5/36* (2006.01)
*B23Q 1/48* (2006.01)
*B23C 3/34* (2006.01)

(52) U.S. Cl.
CPC .......... *B24B 19/02* (2013.01); *B23Q 1/4809* (2013.01); *B23Q 9/0014* (2013.01); *B24B 5/363* (2013.01); *F01D 5/02* (2013.01); *B23C 3/34* (2013.01)

(58) Field of Classification Search
CPC .................. B24B 19/02; F01D 5/02
USPC .................. 451/5, 8, 9, 10, 439, 28
See application file for complete search history.

(56) References Cited

U.S. PATENT DOCUMENTS

| 3,839,941 | A | | 10/1974 | Adams | |
|---|---|---|---|---|---|
| 5,161,291 | A | * | 11/1992 | Guenther | B23C 3/00 29/56.5 |
| 9,056,387 | B2 | * | 6/2015 | Vindler | B24C 3/322 |
| 9,248,528 | B2 | * | 2/2016 | Holmes | B23B 41/00 |
| 2010/0159814 | A1 | * | 6/2010 | Corn | B24B 19/009 451/552 |
| 2014/0223709 | A1 | * | 8/2014 | Clark | B23C 3/30 29/23.51 |

FOREIGN PATENT DOCUMENTS

| DE | 69329546 T2 | 3/2001 |
|---|---|---|
| DE | 102008013008 A1 | 11/2009 |
| SU | 691251 A1 | 10/1979 |

* cited by examiner

*Primary Examiner* — Robert Rose
(74) *Attorney, Agent, or Firm* — Schmeiser Olsen & Watts LLP

(57) ABSTRACT

A machining device, in particular a grinding device, for the machining of slots in a component, in particular radially lying slots in a stationary blade carrier, with a base carrier, a clamping device, which is attached to the base carrier pivotably about a pivot axis and is designed to fix the base carrier on the component to be machined, a guiding rail, which is guided on the base carrier displaceably in a straight line in a guiding plane lying perpendicularly in relation to the pivot axis, and a tool holder head, which is held on the guiding rail pivotably about a rotation axis parallel to the pivot axis and carries fastening means for the attachment of a machining tool is provided.

15 Claims, 5 Drawing Sheets

MACHINING DEVICE

CROSS-REFERENCE TO RELATED APPLICATIONS

This application claims priority to DE Application No. 102014220161.6 having a filing date of Oct. 6, 2014, the entire contents of which are hereby incorporated by reference.

FIELD OF TECHNOLOGY

The following relates to a machining device, in particular a grinding device, for the machining of slots in a component, and here in particular radially lying slots in a stationary blade carrier.

BACKGROUND

In turbine plants, rotors and stators are respectively arranged one behind the other in the compressor and turbine stages. In this case, the rotors form the moving or rotating part of the turbine plant, with which a flowing fluid is either compressed or made to expand. Arranged downstream of each rotor is a guiding device, which passes on in a defined way the flow produced by the rotors. In this case, the guiding devices are arranged one behind the other alternately with the rotors.

A guiding device in a turbine consists in this case of an outer stationary blade ring, on the inner side of which a multiplicity of stationary blades are arranged in a defined manner in the circumferential direction. This outer stationary blade ring is installed in what is known as a stationary blade carrier and is mounted together therewith in the turbine housing. For this purpose, the outer guiding ring is inserted into a corresponding slot in the inner surface of the stationary blade carrier. Usually, the radially inner lying ends of the stationary blades are also connected to an inner guiding ring provided there—also known as a shroud band—in order to seal off the fluid channel with respect to the turbine shaft, reduce gap losses and use a number of stationary blades for influencing the vibrational behavior mechanically. The stationary blades are thereby manually riveted to the inner guiding rings formed as shroud bands. For this, the outer guiding ring with the stationary blades fixed on it must be positioned in the stationary blade carrier or in a corresponding dummy.

The stationary blade carriers are subjected to stresses both during the riveting of the inner guiding rings and during operation. This may in particular cause cracks to form on the inner side of the radial annular slot. The removal of these cracks is likewise performed manually by a grinding operation. However, this operation is relatively laborious, in particular if cracks in the corner radius of a slot have to be ground out.

SUMMARY

An aspect relates to a machining device with which the machining of radially lying slots, i.e. on the radial inner or outer side of annular components, specifically the annular slots on the inner side of a stationary blade carrier, can be machined.

Embodiments of the invention provide a machining device of the aforementioned type with a base carrier, a clamping device, which is attached to the base carrier pivotably about a pivot axis and is designed to fix the base carrier on the component to be machined, a guiding rail, which is guided on the base carrier displaceably in a straight line in a guiding plane lying perpendicularly in relation to the pivot axis, and a tool holder head, which is held on the guiding rail pivotably about a rotation axis parallel to the pivot axis and carries fastening means for the attachment of a machining tool.

Embodiments of the invention are consequently based on the idea of providing a machining device which is fixed directly on the component to be machined and is designed in such a way that a machining tool, such as for example a grinding head, can be moved along a slot to be machined, and here in particular along the corner radius of a slot, in order to perform the desired machining, and is thereby guided exactly. For this purpose, the machining device is fixed on the component to be machined by means of the clamping device. For example, the clamping device may be designed to clamp the base carrier securely in a slot to be machined. For this purpose, it may have clamping means that are designed to be braced, in particular hydraulically, against the slot walls of the slot to be machined. In this case, the clamping device preferably sets down on the slot base, so that it is supported exactly on the component to be machined. After being fixed on the component to be machined, the guiding rail is moved in a straight line in relation to the clamping device. The tool holder head is in this case kept in contact with the inner side of the component to be machined by gravitational force or corresponding pressing means, so that the machining tool is moved along the slot to be machined and thereby retains the orientation necessary for the machining. The required degrees of freedom are provided by the articulated connections between the base component and the guiding rail on the one hand and the guiding rail and the carrier head on the other hand.

According to one embodiment of the present invention, the tool holder head, which is preferably pivotably attached to a front end region of the guiding rail, carries guiding rollers at its lower end region, the arrangement being set up in such a way that the guiding rollers can be placed onto the slot base of the slot to be machined when the base carrier is fixed on the component to be machined, so that the tool holder head is supported on the slot base and can be easily moved along the slot.

It is provided in a development of embodiments of the invention that the fastening means comprise a tool holder, which is fixed on the tool holder head. The tool holder is preferably held on the tool holder head pivotably about a setting axis running parallel to the pivot axis and can be fixed in a predetermined pivoting position. The fixing may be performed for example by means of a screw connection, which can then also define the setting axis. The pivotability of the tool holder makes it possible to set the position of the machining tool exactly with respect to the slot before the machining.

It is provided according to a further embodiment of the invention that on the tool holder head, and in particular on the tool holder, there is fastened a rotating machining tool, the axis of rotation of the tool lying in a plane that is directed transversely in relation to the guiding plane of the guiding rail and being inclined with respect to the guiding plane. In particular, the axis of rotation of the tool may lie in a plane that is directed perpendicularly in relation to the guiding plane. Furthermore, the axis of rotation of the tool is inclined with respect to the guiding plane by an angle which is predetermined by the required machining angle and is in particular 45°.

Finally, according to a preferred embodiment of the invention, the rotating machining tool is guided adjustably in the direction of the axis of rotation on the tool holder head, and in particular the tool holder. The axial adjustability along the axis of rotation, the pivotability of the tool holder with respect to the tool holder head and the settability of the inclination of the axis of rotation allow the machining tool, in particular the grinding tool, to be positioned in the slot in the desired way.

BRIEF DESCRIPTION

Some of the embodiments will be described in detail, with reference to the following figures, wherein like designations denote like members, wherein.

DETAILED DESCRIPTION

Figure 1:
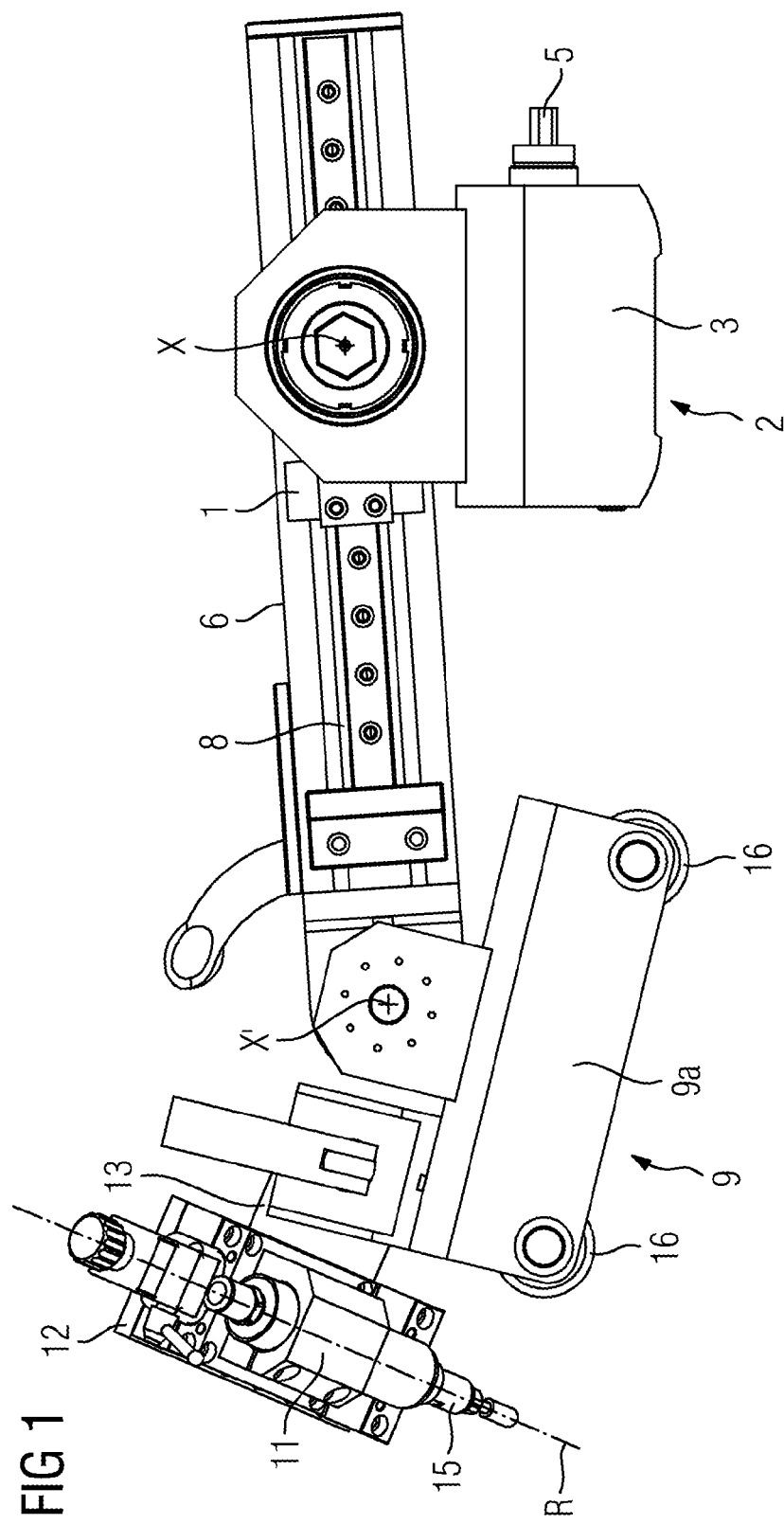
FIG. 1 shows an embodiment of a machining device in a front view.

In FIGS. 1 to 7, a machining device according to embodiments of the present invention is represented, designed here as a grinding device and serving the purpose of machining a radial circumferential slot N on the inner side of a moving blade carrier L, in particular in order to eliminate cracks in the region of the slot N. The grinding device comprises a base carrier 1 and also a clamping device 2, which is attached to the base carrier 1 pivotably about a pivot axis X and is designed to fix the base carrier 1 on the stationary blade carrier L to be machined. In the exemplary embodiment represented, the clamping device 2 is actually designed to clamp the base carrier 1 securely in the slot N to be machined. For this purpose, the clamping device 2 has a main body 3, which can be inserted into the corresponding slot N and for this purpose has a corresponding width in its lower end region. Held in the main body 3 are clamping rams 4, which can be hydraulically or pneumatically extended from the main body 3 parallel to the pivot axis X, so that they can be pressed against the slot walls of the slot N to be machined, in order in this way to brace the main body 3 with the slot walls. In this case, the main body 3 is preferably placed onto the slot base, so that it has a stable position.

The actuation of the clamping device 2 is performed by way of a clamping screw 5, which is screwed into the main body 3, in order to move an actuating ram, which engages in a space for hydraulic medium provided within the main body 3, into this space for hydraulic medium, and consequently to increase the hydraulic pressure in the space for hydraulic medium.

The grinding device also comprises a guiding rail 6, which is guided on the base carrier 1 displaceably in a straight line in a guiding plane lying perpendicularly in relation to the pivot axis X—the plane of the image of FIG. 1. For this purpose, formed on the base carrier 1 are a number of guiding claws 7, which are in engagement with corresponding guiding grooves 8 of the guiding rail 6.

Provided on a front axial end region of the guiding rail 6 is a tool holder head 9, which is held on the guiding rail 6 pivotably about a rotation axis X' parallel to the pivot axis X. The tool holder head 9 carries fastening means 10 for the attachment of a grinding spindle 11. In actual fact, the grinding spindle 11 is held on a plate-shaped tool holder 12 adjustably in the direction of its axis of rotation R. The tool holder 12 is in turn fixed on the tool holder head 9 by way of a fastening angle 13. As FIG. 2 reveals particularly well, the fastening angle 13 is fixed on the tool holder head 9 by way of a single screw 14, which extends parallel to the pivot axis X or rotation axis X'. After loosening of the screw connection, it is therefore possible to pivot the fastening angle 13 with respect to the tool holder head 9 about a setting axis X" defined by the screw connection and then to arrest the fastening angle 13 in the position desired by fixing the screw connection.

Figure 2:
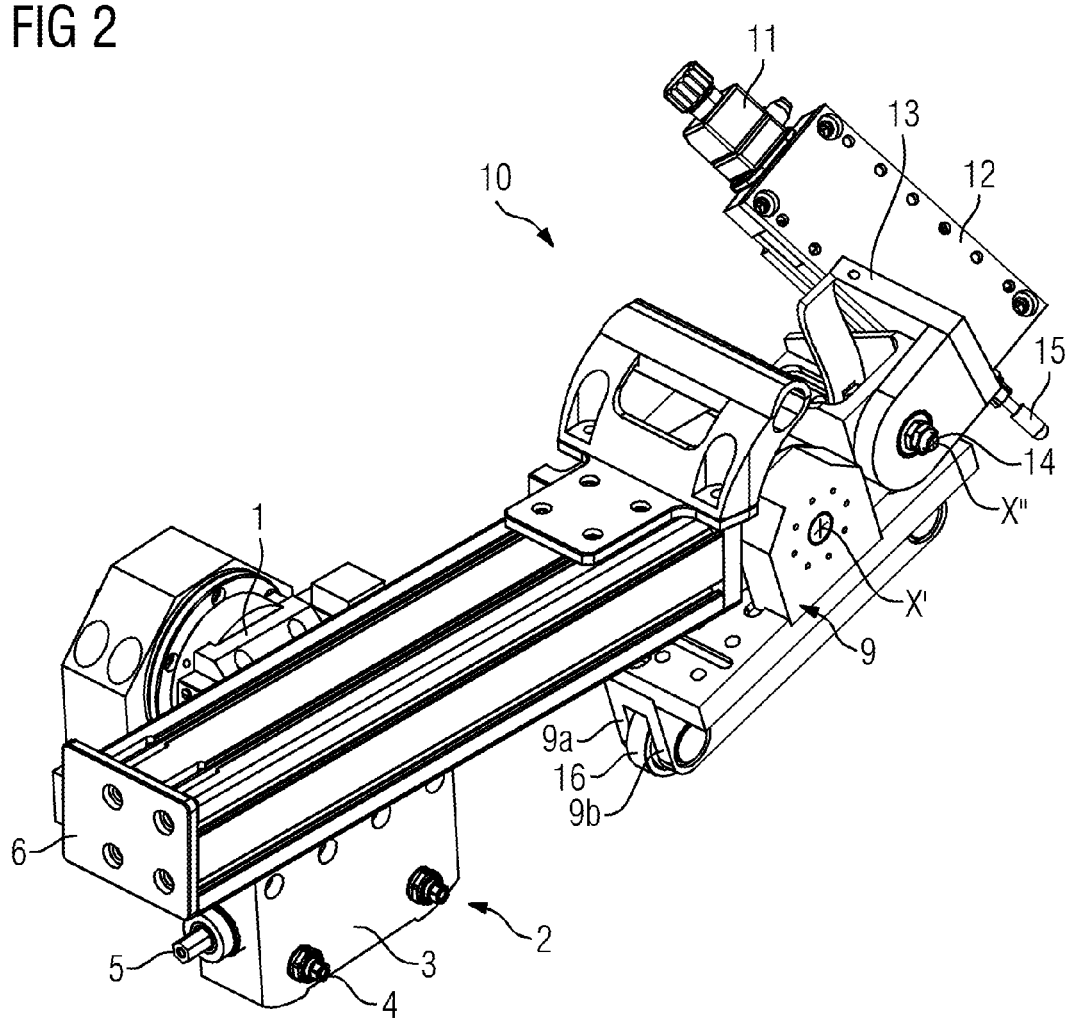
FIG. 2 shows an embodiment of the machining device in a perspective view obliquely from behind.
Figure 3:
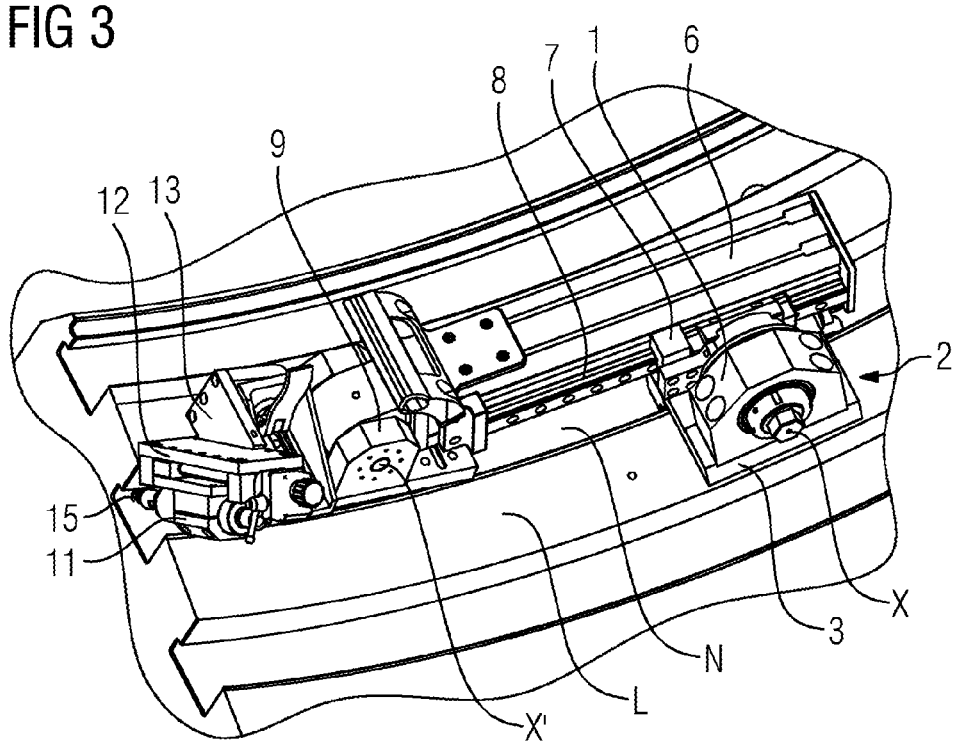
FIG. 3 shows an embodiment of the machining device from FIG. 1 mounted on a stationary blade carrier to be machined.
Figure 4:
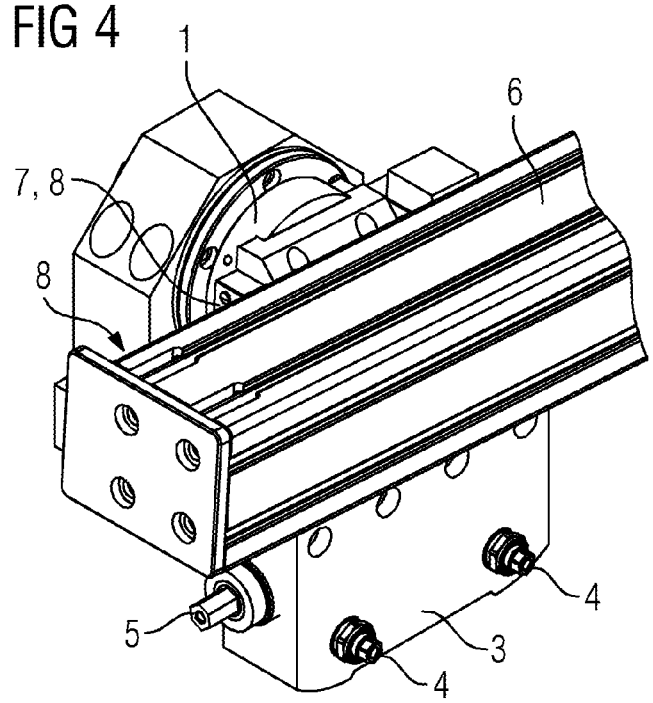
FIG. 4 shows, in an enlarged partial view, an embodiment of the part of the machining device with the base carrier, clamping device and guiding rail, obliquely from the rear and above.
Figure 5:
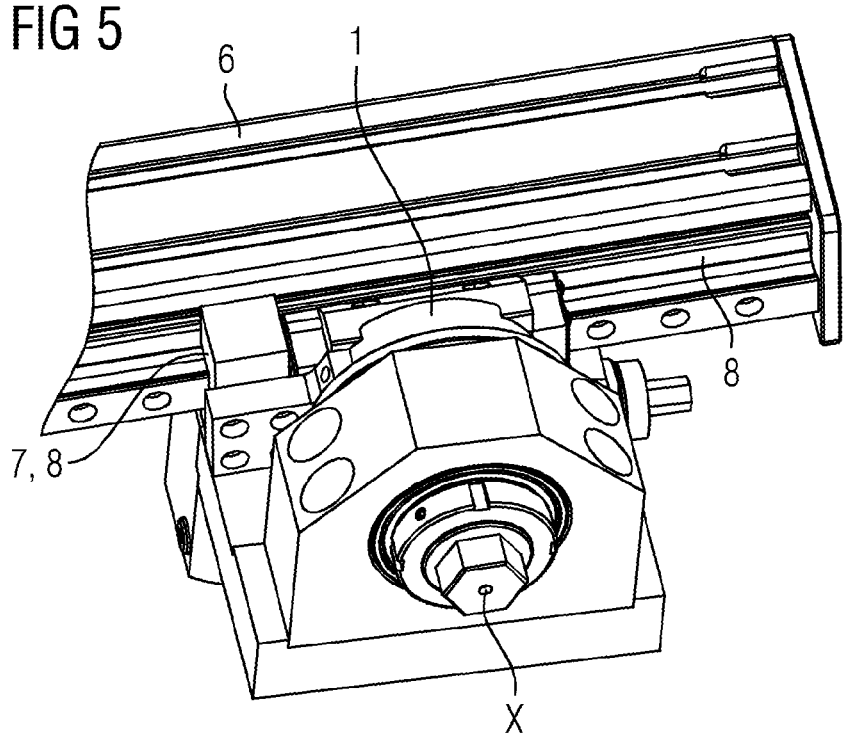
FIG. 5 shows an embodiment of the rear part of the machining device in a perspective view obliquely from the front and above.
Figure 6:
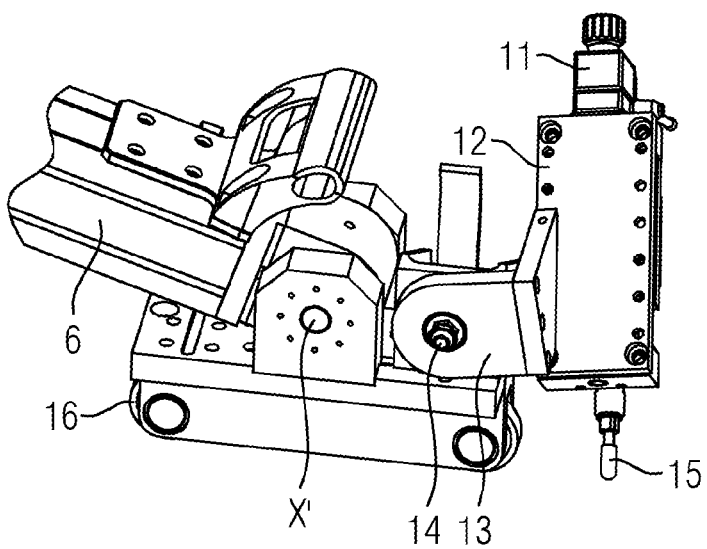
FIG. 6 shows an embodiment of the front part of the machining device in a perspective view obliquely from the rear and above.
Figure 7:
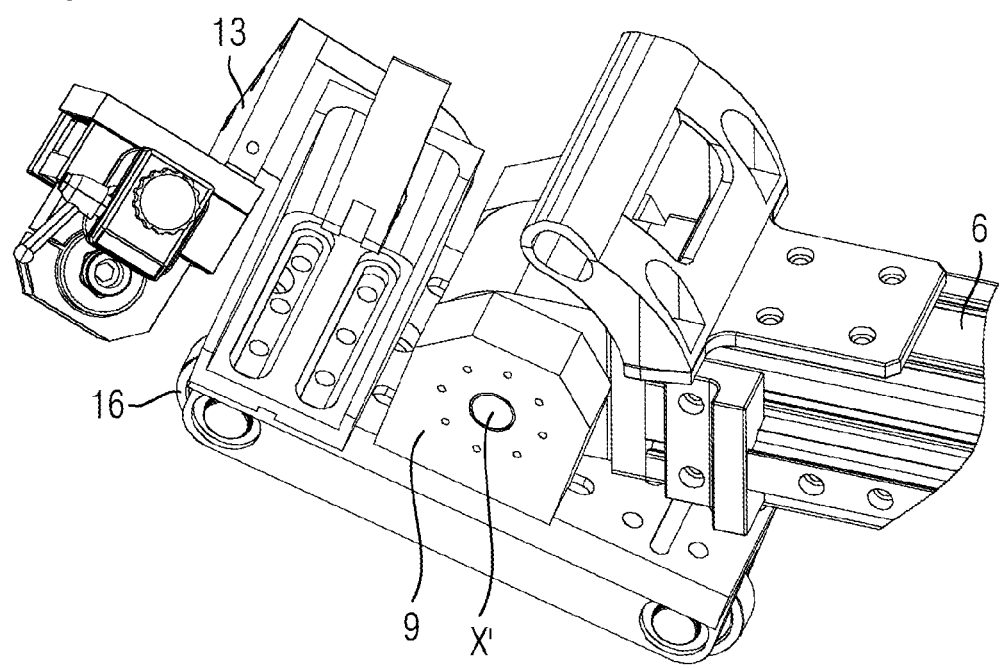
FIG. 7 shows an embodiment of the front region of the machining device in a perspective representation obliquely from the front and above.

As FIGS. 2, 6 and 7 reveal, the axis of rotation R of the grinding spindle 11 lies in a plane that is directed perpendicularly in relation to the guiding plane defined by the guiding rail 6, it being inclined with respect to the guiding plane by a predetermined angle, which here is approximately 45°. This arrangement allows the grinding head of a grinding tool 15 clamped in the grinding spindle 11 to be positioned with respect to a region to be machined of the slot N, in particular with respect to the corner region of the slot N, as can be seen in FIG. 3.

At its lower end region, the tool holder head 9 carries two guiding rollers 16. The arrangement is in this case set up in such a way that the guiding rollers 16 can be placed onto the slot base of the slot N to be machined. In actual fact, the tool holder head 9 has two downwardly protruding webs 9a, 9b, between which the guiding rollers 16 are held in a rotating manner. The width of the webs 9a, 9b and the distance between the webs 9a, 9b are in this case chosen in such a way that the guiding rollers can be inserted with the webs 9a, 9b into the slot N to be machined.

During operation, the machining device is fixed on the stationary blade carrier L to be machined by means of the clamping device 2. For this purpose, the main body 3 of the clamping device is inserted into the slot N until it comes into contact with the slot base. Subsequently, the clamping rams 4 are extended in order to clamp the main body 3 of the clamping device securely in the slot N, in that the clamping rams 4 are pressed against the slot walls. The actuation of the clamping rams 4 is performed by turning the clamping screw 5. After the fixing of the machining device on the stationary blade carrier L, the tool holder head 9 is inserted into the slot N until the guiding rollers 16 set down on the slot base. Such positioning is possible on account of the relative pivotability between the tool holder head 9 and the guiding rail 6 on the one hand and the guiding rail 6 and the base carrier 1 on the other hand.

Finally, the grinding spindle 11 is adjusted along its axis of rotation R to the extent that it assumes its desired machining position. During the grinding operation, the guiding rail 6 is adjusted together with the tool holder head 9 and the grinding spindle 11 held thereon in a straight line with respect to the base carrier 1 fixed securely in its location on the stationary blade carrier L, in order to move the grinding spindle 11 with the grinding tool 15 held therein parallel to the slot. The grinding spindle 11 thereby actually executes a circular movement along the slot N, because the guiding rollers 16 are held on the slot base. The required degrees of freedom are created by the pivot axis X and the rotation axis X'.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A machining device for the machining of slots in a component, comprising:
    a base carrier;
    a clamping device, which is attached to the base carrier pivotably about a pivot axis and is designed to fix the base carrier on the component to be machined;
    a guiding rail, which is guided on the base carrier displaceably in a straight line in a guiding plane lying perpendicularly in relation to the pivot axis; and
    a tool holder head, which is held on the guiding rail pivotably about a rotation axis parallel to the pivot axis and carries a fastening means for the attachment of a machining tool.

2. The machining device as claimed in claim 1, wherein the clamping device is configured to clamp the base carrier securely in a slot to be machined.

3. The machining device as claimed in claim 2, wherein the clamping device has a clamping means configured to be braced against the slot walls of the slot to be machined.

4. The machining device as claimed in claim 1, wherein the tool holder head is attached pivotably on a front end region of the guiding rail.

5. The machining device as claimed in claim 1, wherein the tool holder head carries a plurality of guiding rollers at a lower end region, an arrangement being set up in such a way that the plurality of guiding rollers are placed onto a slot base of a slot to be machined.

6. The machining device as claimed in claim 1, wherein the fastening means) comprises a tool holder, which is fixed on the tool holder head.

7. The machining device as claimed in claim 6, wherein the tool holder is held on the tool holder head pivotably about a setting axis running parallel to the pivot axis and is fixed in a predetermined pivoting position,
    the fixing being performed by means of a screw connection, which defines the setting axis.

8. The machining device as claimed in claim 1, wherein on the tool holder, there is fastened a rotating machining tool, an axis of rotation of the tool lying in a plane that is directed transversely in relation to the guiding plane of the guiding rail and being inclined with respect to the guiding plane.

9. The machining device as claimed in claim 8, wherein the axis of rotation of the tool lies in a plane that is directed perpendicularly in relation to the guiding plane.

10. The machining device as claimed in claim 8, wherein the axis of rotation of the tool is inclined with respect to the guiding plane by a predetermined angle of 45°.

11. The machining device as claimed in claim 8, wherein the rotating machining tool is guided adjustably in a direction of the axis of rotation on the tool holder.

12. The machining device as claimed in claim 1, wherein the machining tool is a grinding spindle or comprises a grinding spindle.

13. The machining device as claimed in claim 1, wherein the machining device is a grinding device.

14. The machining device as claimed in claim 1, wherein the slots are radially lying slots.

15. The machining device as claimed in claim 3, wherein the clamping means is configured to be hydraulically braced against the slot walls of the slot to be machined.

* * * * *